United States Patent [19]
Chartrand

[11] Patent Number: 5,652,972
[45] Date of Patent: Aug. 5, 1997

[54] INSULATING PANEL

[76] Inventor: Paul-Émile Chartrand, 210, 9$^{ième}$ Avenue, Ste-Anne-des-Plaines, Québec, Canada, J0N 1H0

[21] Appl. No.: 544,563

[22] Filed: Oct. 18, 1995

[51] Int. Cl.$^6$ ............................................. E04H 4/14
[52] U.S. Cl. ........................... 4/506; 4/493; 219/535
[58] Field of Search ............................ 4/493, 506, 545; 219/528, 529, 535, 385

[56] References Cited

U.S. PATENT DOCUMENTS

| | | | |
|---|---|---|---|
| 2,423,488 | 7/1947 | Dowe | 219/528 |
| 3,051,821 | 8/1962 | Dion | 219/529 |
| 3,393,297 | 7/1968 | Hart | 219/535 X |
| 4,210,073 | 7/1980 | Weiss | 219/385 X |
| 5,293,583 | 3/1994 | Chudgar | 219/385 X |
| 5,400,549 | 3/1995 | Morgan | 4/498 |

*Primary Examiner*—Robert M. Fetsuga
*Attorney, Agent, or Firm*—F. Martineau

[57] ABSTRACT

The present invention relates to a flexible insulating panel for an out-of-ground swimming pool, the latter comprising vertical structural ribs that radially outwardly protrude therefrom. The panel comprises a substantially rectangular insulating foam liner encased in a protective jacket. The panel defines an inner surface abutting on the outer surface of the pool peripheral wall and a water-resistant outer surface. The panel is correctly dimensioned and adapted to fit between two consecutive ribs, a plurality of panels thus being installed in a peripheral consecutive manner along the peripheral wall of the pool. The jacket of the panel has two flanges that extend tangentially, relative to the pool peripheral wall, each flange straddling the flange of the next panel, adjacent to and over the rib between the two of them. Each flange has eyelets that allow a fastening cable to attach the flanges of two consecutive panels together, to releasably attach the panels to one another and thus form a modular insulating assembly.

2 Claims, 2 Drawing Sheets

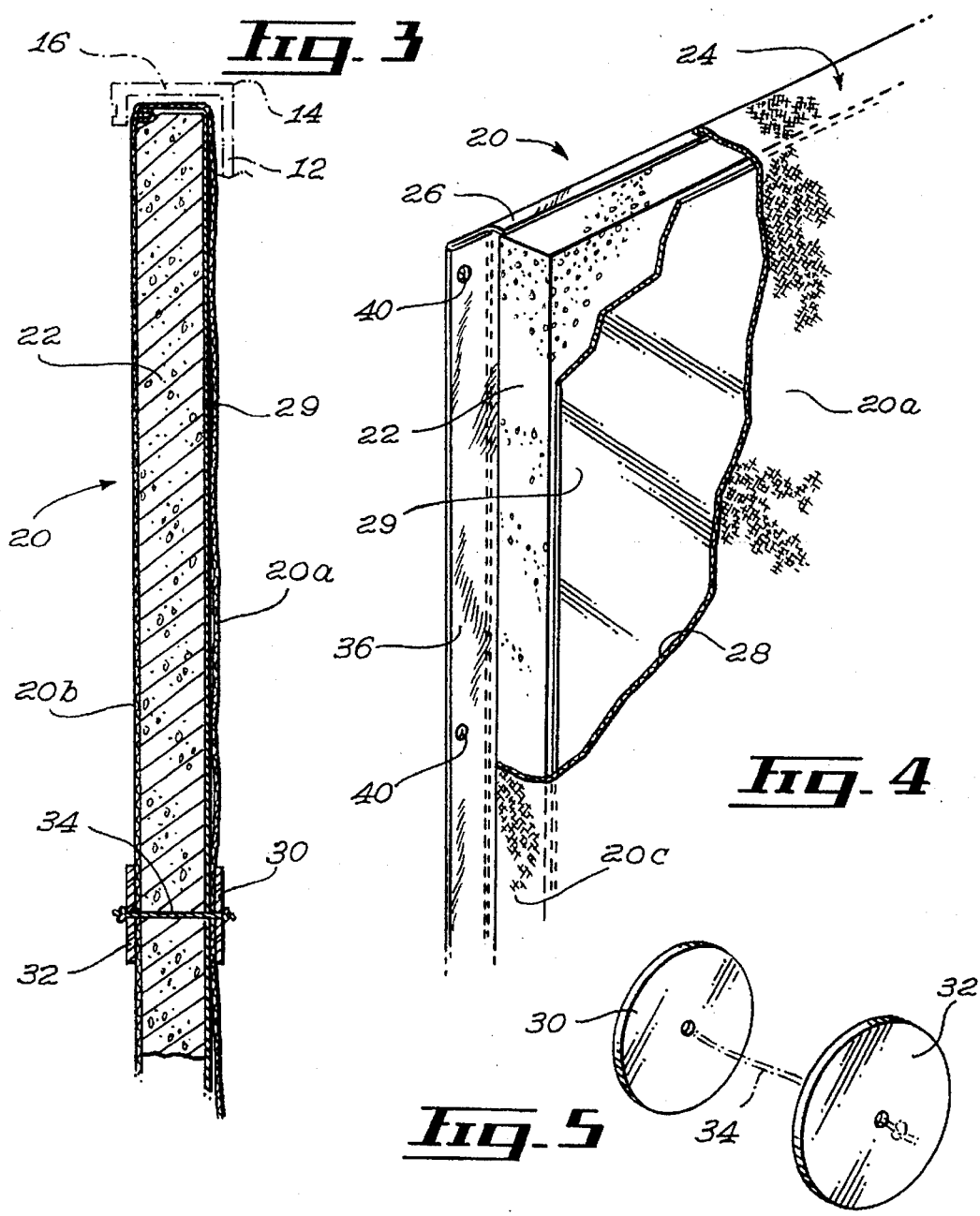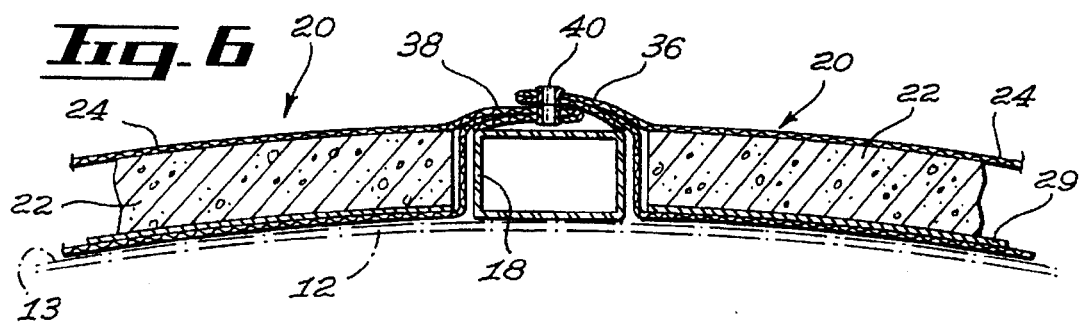

5,652,972

INSULATING PANEL

FIELD OF THE INVENTION

The present invention relates to an insulating panel, and more particularly to an insulating panel for use on an out-of-ground swimming pool.

BACKGROUND OF THE INVENTION

Out-of-ground swimming pools are popular because they are much less expensive than in-ground pools. Indeed, it is not necessary to dig any holes or alter the ground in any way, if there is a flat area large enough to receive the out-of-ground pool.

A problem with out-of-ground pools is that they do not take advantage of the beneficial insulating soil around them as do in-ground pools, since the pool walls are surrounded by the atmospheric air. The walls of out-of-ground pools are often made of a metallic sheet, e.g. aluminium, and consequently do not have good insulating properties to keep the water warm. Indeed, the pool water will often become much colder by loosing its heat through the pool walls, the metal (such as aluminium) being a good thermal conductor.

A solar sheet is often used as a heat insulating barrier and to prevent water evaporation which has a cooling effect on the water. It also heats the pool water through the instrumentality of the sun rays, the sheet floating on the water surface and concentrating the sun rays in the water. However, despite the use of a sheet, a considerable amount of heat loss takes place through the pool walls. It consequently costs more to the pool owner for heating his pool water.

OBJECTS OF THE INVENTION

It is an object of this invention to provide an insulating panel for out-of-ground pool walls to reduce the overall thermal conductance of the pool.

SUMMARY OF THE INVENTION

The present invention relates to a flexible insulating panel for use on an out-of-ground swimming pool, said swimming pool defining a peripheral wall and an outer surface thereon, said insulating panel comprising an insulating liner encased in an outer jacket that is water-resistant on at least one side, said jacket having attachment means on two opposite ends to removably attach a number of said insulating panels on said peripheral wall outer surface.

Preferably, said pool rests on the ground and defines a plurality of structural rib members radially protruding from said peripheral wall outer surface, said peripheral wall defining a top edge, said insulating panel correctly dimensioned and adapted to fit between two consecutive rib members and to extend from the ground up to said peripheral wall top edge, said liner of a thickness approximately equal to the thickness of said rib members so as to form a substantially even outer peripheral surface when one of said insulating panels is installed between each consecutive rib members.

Advantageously, each said panel defines a first and a second end each comprising a thin flexible flange integral to said jacket and destined to tangentially extend therefrom when said panel is installed on said pool wall, said first end of each said panel being attached to said second end of another said panel to link said panels in a consecutive manner and thus form a modular insulating assembly.

Preferably, said flexible flanges of the first end of a first said panel and of the second end of a second said panel straddle one another adjacent to and over a said rib member.

Advantageously, said pool peripheral wall defines a top flange radially outwardly extending from said top edge, said top flange being wider than said thickness of said insulating panel, said insulating panel defining an inner and an outer surface, said panel inner surface being destined to abut on said peripheral wall outer surface, said panel outer surface being water-resistant, said top flange being destined to extend over said insulating panel, the latter thus being protected from the rain on all sides.

Preferably, said attachment means is a plurality of spaced-apart eyelets along said flexible flange, said eyelets to be engaged by a fastening device, each said fastening device securely engaging the respective eyelets of said first and second ends of two respective panels adjacent to one another so as to releasably attach them to one another, the position of said eyelets of said first panel first end and of said second panel second end registering with one another.

Advantageously, said insulating panel further comprises heating means on said panel inner surface to conduct heat through said peripheral wall into said pool.

Preferably, said heating means is an electrically resistant membrane that covers most of said panel inner surface.

Alternately, the invention relates to the combination of an out-of-ground swimming pool and a modular insulating assembly, said swimming pool defining a peripheral wall, an outer surface thereon and a top edge, said swimming pool destined to rest on the ground and defining a plurality of structural rib members radially protruding from said peripheral wall outer surface, said modular insulating assembly comprising a number of releasably linked insulating panels defining an inner surface abutting on said peripheral wall outer surface and an outer surface, each of said insulating panels comprising an insulating liner encased in an outer jacket that is water-resistant on at least said panel outer surface, said insulating panel correctly dimensioned and adapted to fit between two consecutive rib members and to extend from the ground up to said peripheral wall top edge.

Preferably, each said panel defines a first and a second end each comprising a tangentially extending flexible flange, said first end of each said panel being attached to said second end of another said panel to link said panels in a consecutive manner and thus form said modular insulating assembly, said flexible flanges of the first end of a first said panel and of the second end of a second said panel straddling one another adjacent to and over a said rib member.

DESCRIPTION OF THE DRAWINGS

In the annexed drawings:

FIG. 3 is a partial cross-sectional view, at an enlarged scale, taken along line III—III of FIG. 2;

FIG. 4 is a partial fragmented perspective view of the insulating panel of the invention;

FIG. 5 is a perspective view, at an enlarged scale, of the buttons of the insulating panel; and FIG. 6 is a cross-sectional view of the rib member and two insulating panels, at an enlarged scale, taken along line VI—VI of FIG. 1.

DETAILED DESCRIPTION OF THE PREFERRED EMBODIMENT

Figure 1:
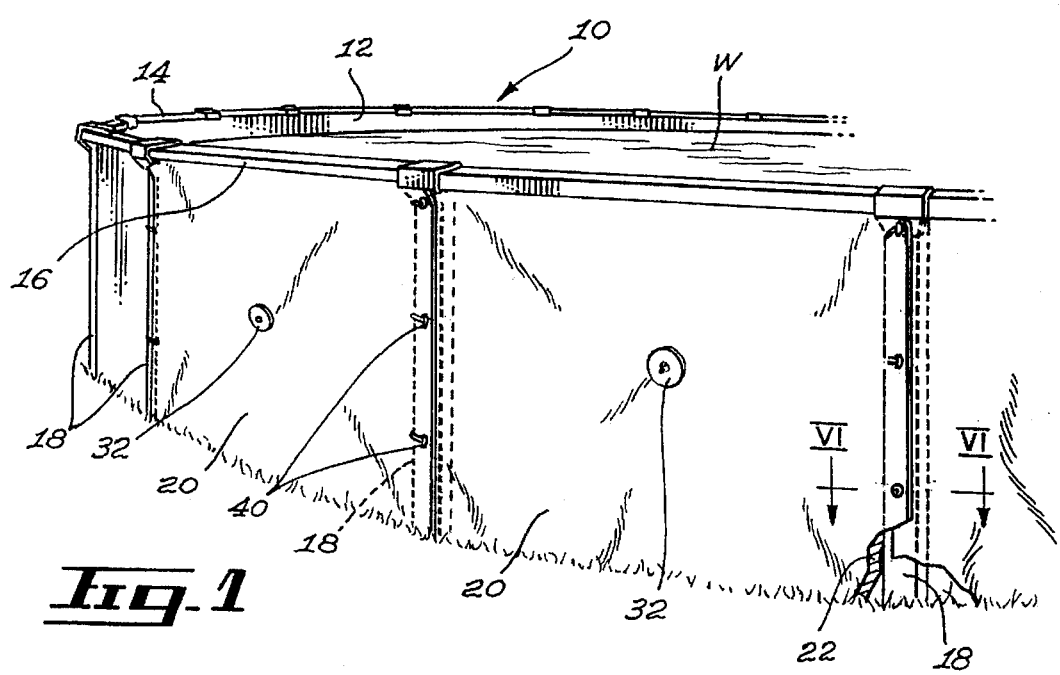
FIG. 1 is a partial perspective view of an out-of-ground swimming pool equipped with a number of insulating panels of the invention.

FIG. 1 shows a conventional out-of-ground swimming pool 10 at least partly filled with water W. Pool 10 is formed of a water proof sheet defining a side wall and a bottom wall, the latter destined to rest on the ground. A rigid peripheral retaining wall 12 encloses the sheet side wall and defines an outer surface 13 (FIG. 6), a top edge 14 and a top flange 16 radially outwardly extending therefrom. Pool 10 comprises a plurality of equally-spaced, structural rib members 18 which extend vertically from the ground to top flange 16, as is already known in the art. Rib members 18 radially protrude relative to outer surface 13 of peripheral wall 12. Wall 12 is normally made of a thin metallic sheet.

A number of flexible insulating panels 20 are installed on said pool peripheral wall outer surface 13.

Figure 2:
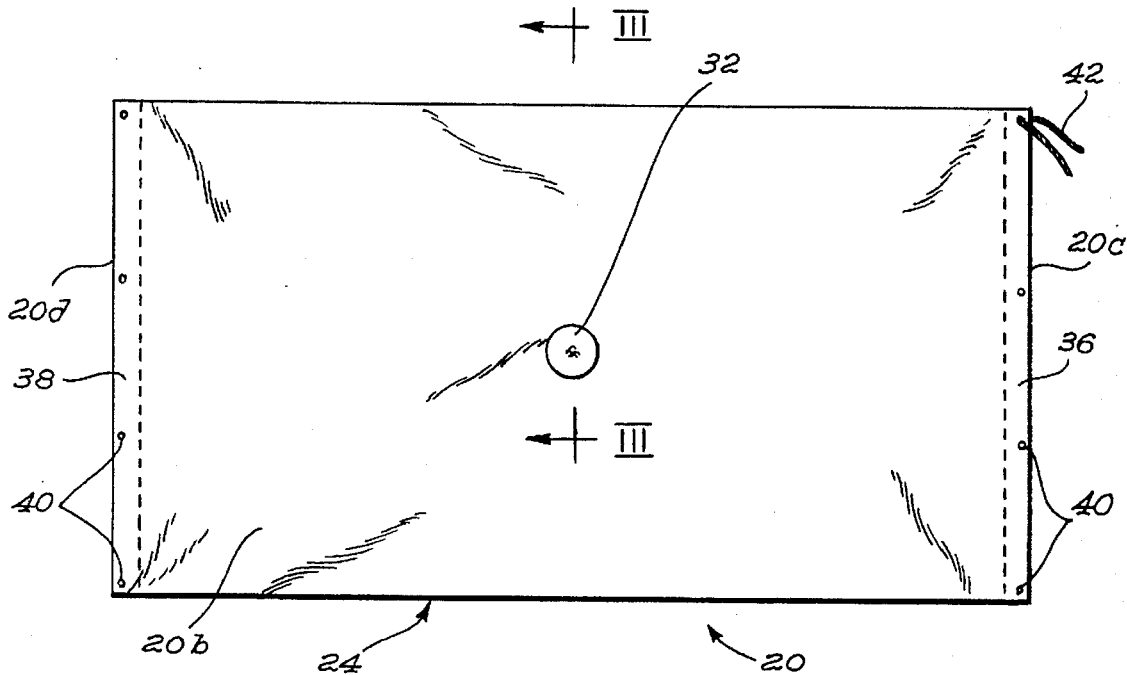
FIG. 2 is an elevation of an insulating panel according to the invention.

FIGS. 2 to 4 show that each insulating panel 20 comprises an insulating liner 22 encased in a protective outer jacket 24. Panel 20 defines an inner and an outer surface 20a and 20b, inner surface 20a being destined to abut against the peripheral wall outer surface 13.

Liner 22 is generally rectangular and preferably made of a light, thermally insulating material such as foam, or any other similar suitable material. Liner 22 is also preferably water-proof, being a closed-cell foam.

Outer jacket 24 comprises a rectangular cover 26 and a net 28.

Rectangular cover 26 lays flatly against one side of liner 22, and corresponds to outer surface 20b of panel 20. Cover 26 is made of a water resistant material, such as a thick cotton layer, said material being also thick enough to be significantly resistant to tearing or damaging.

Net 28 is thin and holds liner 22 on all sides except outer surface 20b of panel 20. Net 28 and cover 26 are securely anchored to one another, e.g. they are sewn. Therefore, liner 22 is securely encased in jacket 24.

A rectangular vapor screen 29 is installed between liner 22 and net 28 to prevent an excess of vapor from being trapped between liner 22 and peripheral wall 12. Vapor screen 29, as is known in the art, is made of an aluminium sheet coated with a plastic film. The aluminium also acts as a heat reflector, reflecting the escaped heat back into pool 10.

Two buttons 30, 32, positioned near the center part of panel 20 and bearing respectively on inner and outer surface 20a and 20b, are linked by a short wire 34, e.g. made of plastic, which passes through liner 22 and jacket 34 to prevent any relative movement of the two latter.

Panel 20 defines a first and a second opposite ends 20c, 20d destined to stand vertically. At each end 20c, 20d, cover 26 has a thin flexible flange 36, 38 extending parallel to outer surface 20b and spanning the whole height of panel 20. Flanges 36, 38 each have complementary attachment means, e.g. a plurality of eyelets 40. As shown in FIG. 2, eyelets 40 can be engaged by a fastening device, such as small fastening cables 42.

In use, a plurality of insulating panels 20 are to be installed on outer surface 13 of pool peripheral wall 12. Each panel 20 is correctly dimensioned and adapted to fit between two consecutive rib members 18 and to extend from the ground up to peripheral wall top edge 14. Liner 22 has a thickness which is preferably approximately equal to the thickness of rib members 18, and therefore panel 20 has a thickness which is approximately equal to the thickness of rib members 18, since jacket 24 is relatively thin. Consequently, when one insulating panel 20 is installed between each consecutive rib members 18, a substantially even outer peripheral surface is formed with outer surface 20b of panels 20 and rib members 18.

The flange 36 of first end 20c and the flange 38 of second end 20d of two consecutive insulating panels 20 straddle one another adjacent to and over the rib member 18 located between the two consecutive panels 20. The position of eyelets 40 of both flanges 36, 38 register with one another so as to allow a fastening cable 42 to be inserted into each pair of registering eyelets 40 and thus removably attach the first end 20c and the second end 20d of the two consecutive panels 20. This way, panels 20 can all be releasably linked to one another in a consecutive manner and thus form a modular insulating assembly removably covering the whole outer surface 13 of peripheral wall 12.

Since panels 20 are approximately of the same thickness as rib members 18, top flange 16 will extend over panels 20, and the latter will be protected from rain and potentially harmful impacts on all sides since it will be surrounded on all sides by pool 10 (including rib members 18 and top flange 16) except on its outer surface 20b, which is protected by resistant cover 26.

The purpose of panels 20 is to insulate peripheral wall 12 of pool 10. Indeed, since peripheral wall 12 is often made of a metallic material, e.g. aluminium, its thermal conductance will be important. Panels 20, since they comprise insulating liner 22, will significantly reduce the overall thermal conductance of pool 10. It is important to note that, since net 28 is very thin, liner 22 comes in almost direct contact with the outer surface 13 of peripheral wall 12 and can thus be more efficient. Indeed, panels 20 will bear directly on peripheral wall outer surface 13 since they are inserted between rib members 18, and are therefore not spaced from wall 12 by rib members 18. This is highly desirable, since to leave space between peripheral wall 12 and panels 20 would mean to allow air circulation, and would thus hamper the insulating properties of panels 20. Since panels 20 bear directly on peripheral wall 12, no air circulation is allowed and therefore the insulating properties of panels 20 are optimized.

When the water is heated, it is likely to stay warm longer and be more comfortable for the swimmers. The combined use of insulating panels 20 and a solar sheet would become very advantageous. If the water is heated through the instrumentality of a conventional water heater, it is likely that it will cost less to heat the water during the summer, since, once again, the water will stay warmer than if there was no insulating panels.

It is possible to include heating means (not shown) installed on inner surface 20a of panels 20. For example, the heating means could be a rectangular electrically resistant membrane that covers most of inner surface 20a of each panel 20 between vapor screen 29 and peripheral wall 12, so as to transmit heat through peripheral wall 12 when electrical current passes through membrane.

The attachment means, for attaching the flanges of two consecutive insulating panels, could be any other suitable means than a fastening cable. For example, complementary loop and band fastener straps could be provided on each flange to attach them to one another.

Within the scope of the invention, the rib members of the pool could also be positioned otherwise than suggested in the drawings. For example, the rib members could be inclined along the outer surface 13 of the peripheral wall of the pool instead of being vertical: the insulating panels would then have to be shaped accordingly, to fit between two consecutive rib members. If there are no rib members at all, the insulating panels could still be installed on the pool peripheral wall, of course. It is also possible to provide (especially in the case where there is only one rib member or none at all) a single, long panel member correctly dimensioned to surround the whole pool and be installed on its peripheral wall.

Also, it would be possible to attach the panels on the rib members themselves, instead of attaching them together over the rib members.

I claim:

1. The combination of an out-of-ground swimming pool and a modular insulating assembly, said swimming pool defining a peripheral wall, an outer surface thereon and a top edge, said swimming pool destined to rest on the ground and defining a plurality of structural rib members radially protruding from said peripheral wall outer surface, said modular insulating assembly comprising a plurality of releaseably linked insulating panels defining an inner surface abutting on said peripheral wall outer surface and an outer surface;

each of said insulating panels comprising an insulating liner encased in an outer jacket that is water-resistant on at least said panel outer surface, said insulating panel correctly dimensioned and adapted to fit between two consecutive rib members and to extend from the ground up to said peripheral wall top edge;

wherein substantially all said peripheral wall of said swimming pool is thermally insulated.

2. The combination as defined in claim 1, wherein each said panel defines a first and a second end each comprising a tangentially extending flexible flange, said first end of each said panel being attached to said second end of another said panel to link said panels in a consecutive manner and thus form said modular insulating assembly, said flexible flanges of the first end of a first said panel and of the second end of a second said panel straddling one another adjacent to and over a said rib member.

* * * * *